United States Patent [19]

MacDonald

[11] 4,075,046
[45] Feb. 21, 1978

[54] TIPPED LACE

[75] Inventor: Harold B. MacDonald, Hudson, Mass.

[73] Assignee: Thomas Taylor & Sons, Inc., Hudson, Mass.

[21] Appl. No.: 731,778

[22] Filed: Oct. 12, 1976

[51] Int. Cl.$^2$ ............................................. B32B 31/20
[52] U.S. Cl. ........................... 156/73.1; 156/73.6; 156/180; 156/580.2; 156/583; 264/23; 264/69; 264/159; 264/248; 264/322
[58] Field of Search ............ 156/166, 73.1, 73.2, 156/580.2, 180, 73.6, 583; 264/23, 150, 157, 159, 322, 248, 69

[56] References Cited

U.S. PATENT DOCUMENTS

| | | | |
|---|---|---|---|
| 1,040,662 | 10/1912 | Gallison | 156/166 |
| 3,184,354 | 5/1965 | Strother | 156/73.2 |
| 3,386,870 | 6/1968 | Morin | 156/580.2 |
| 3,542,618 | 11/1970 | DeVaughn | 264/150 |
| 3,575,752 | 4/1971 | Carpenter | 156/73.2 |
| 3,616,064 | 10/1971 | Long et al. | 156/580.2 |

Primary Examiner—Edward G. Whitby
Attorney, Agent, or Firm—Dike, Bronstein, Roberts, Cushman & Pfund

[57] ABSTRACT

The method of rigidifying portions of flexible structures comprised in part or wholly of yarns comprised of man-made fibers of filaments wherein the fibers or filaments of the yarns become welded to each other, specifically to a method of welding the constituent yarns of shoelaces at the ends of the laces so as to form rigid tips of reduced cross section at the ends; to joining two or more yarns at predetermined intervals to form a compound structure; and to joining parallel or crossing portions of yarns arranged in a predetermined relation to each other to form a dimensionally stable structure, by means of sonic vibration supplemented by pressure; and to apparatus for carrying out the method.

6 Claims, 15 Drawing Figures

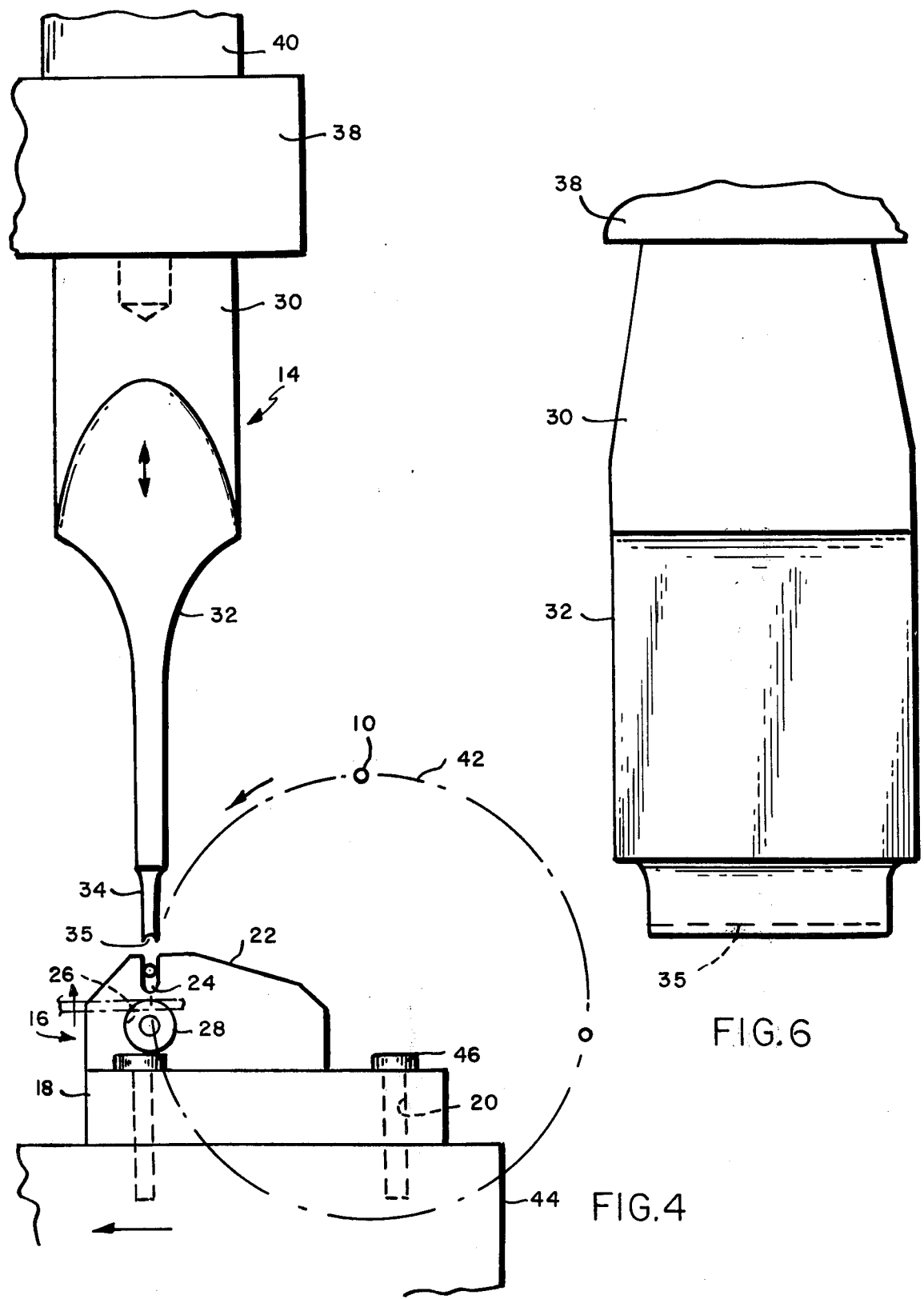

TIPPED LACE

BACKGROUND OF INVENTION

The tips at the ends of shoelaces are generally made by wrapping the ends with metal or with thermoplastic which can be made rigid. It is one purpose of this invention to make rigid tips at the ends of shoelaces without the addition of tipping material by rigidifying the material of the lace itself, thus effecting a substantial economy in the manufacture of the laces. The method embodies reducing the cross section of the lace at the end portions and welding the fibers or filaments of the constituent yarns of the lace to each other and, hence, it has application in addition to forming tips at the ends of shoelaces comprised of a concatentation of yarns to the welding of two or more yarns to each other at predetermined intervals to form multistrand structures or to the welding of adjacent or crossing portions of yarns arranged in predetermined relation to form a dimensionally stable structure.

SUMMARY OF INVENTION

As herein illustrated, in its broadest aspect, the method comprises forming a rigid or semirigid portion in a flexible length of concatenated yarns embodying a material which may be made rigid and hard by heating to a predetermined temperature followed by cooling to ambient temperature comprising subjecting the length to be made rigid to ultrasonic vibrations in a confining mold embodying the cross section desired to be imparted to the rigid portion to effect heating to said predetermined temperature, removing the length from the mold and allowing it to cool to ambient temperature. For the making of shoelaces, the method comprises rigidifying longitudinally spaced portions of a length of lace comprised of concatenated yarns such as to provide therebetween portions which are greater in length than said predetermined portions to be tipped and after treating said portions, severing the treated portions intermediate the ends. For the making of compound yarns or structures, the method comprises welding the yarns to be compounded to each other at predetermined intervals and to welding parallel or crossing portions of the yarns to each other in a structure wherein the yarns are arranged in predetermined relation to each other. This method includes focusing the ultrasonic vibrations at the center of the cross section, electrically heating one of the dies to a temperature on the order of 150° to 850° F, employing a pressure on the order of 15 pounds per square inch and using an ultrasonic vibrator capable of producing 20,000 to 100,000 cycles per second.

The apparatus for tipping shoe laces comprises male and female dies, said female die containing an elongate, concave groove corresponding in length to the length of the part to be treated and said male die embodying a blade for engagement within the concave groove, the leading end of which contains a concave groove, said grooves collectively defining a substantially parabolic recess for receiving the parts to be rigidified. There is means for effecting ultrasonic vibration of the male die while engaged within the groove in the female die and said parabolic surfaces focus the ultrasonic vibrations at the geometric center of the cross section of the part contained within the recess. The bottom of the grooves are provided with mirror finishes to maximize the focus and may be provided with inwardly projecting ribs so as to form grooves longitudinally of the rigidified portions. For making compound yarns or structures, the die is provided with multiple recesses appropriately arranged for the structure.

The invention will now be described in greater detail with reference to the accompanying drawings, wherein:

FIG. 4 is an enlarged elevation of the dies for condensing and rigidifying the materials diagrammatically showing means for moving successive lengths of the material into a position to be operated upon by the dies;

FIG. 6 is an elevation of the male component of the dies;

One of the purposes of this invention is to form rigid or semirigid tips of reduced cross section at the ends of shoelaces. However, it is to be understood that it may be employed for making rigid and semirigid tips at the ends of lacing used for other purposes, or for the making of semirigid or rigid portions of predetermined length in lengths of flexible materials other than shoelaces.

Figure 2:
FIG. 2 is an elevation of the length of material following condensation and rigidification.
Figure 3:
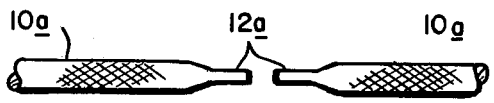
FIG. 3 is an elevation of the length of material shown in FIG. 2 divided intermediate the ends of the condensed rigidified portion.
Figure 5:
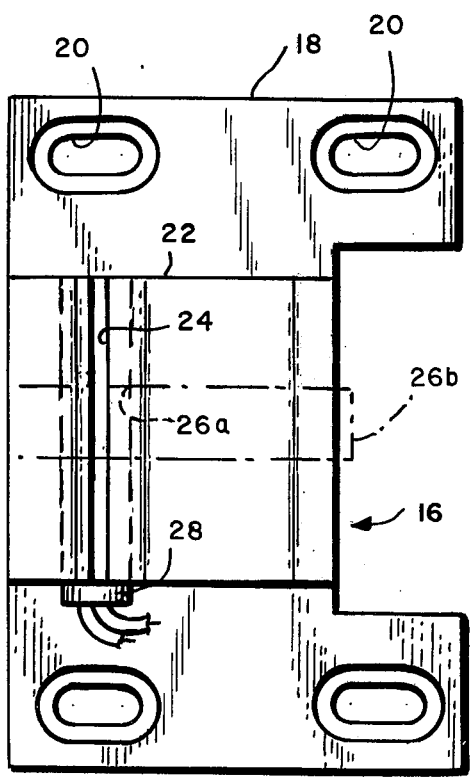
FIG. 5 is a plan view of the female component of the dies.
Figure 7:
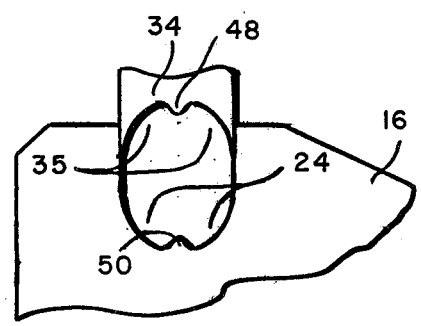
FIG. 7 is a fragmentary enlarged elevation of a modification of the acting surfaces of the male and female dies.

Referring to the drawings, FIGS. 2 and 3, there is shown a length of material 10 which has in it a portion 12 of reduced, condensed cross section which is rigid or semirigid. This reduced, rigid or semirigid portion 12 is formed by placing a length 10 of uniform cross section between male and female dies 14 and 16 and subjecting the material 10 to heat and pressure by means of sonic or ultrasonic vibrations. Supplemental heating at a lower than fusing temperature may also be provided by electrically heating the female die. After condensing and cooling to form the rigid portion 12, the latter is divided intermediate its ends, FIG. 3, by suitable means to provide successive lengths 10a, each of which has at its opposite ends a rigid tip 12a.

Figure 1:
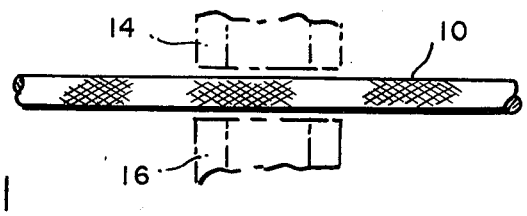
FIG. 1 is an elevation of a length of material situated between dies by means of which a portion of the material is to be condensed in cross section and made rigid.

The apparatus for accomplishing the foregoing comprises, as related above, male and female dies 14 and 16 diagrammatically shown in FIG. 1 which are specifically illustrated in one form in FIGS. 4 to 6A. The female die 16 comprises a rigid block 18 of a steel alloy provided at its corners with openings 20 of elongate configuration and at the top with a platen 22 containing longitudinally thereof a concave groove 24, the bottom of which may be provided with a mirror finish. The platen 22 as shown contains a longitudinally extending hole 26a below the bottom of the groove 24 for receiving a heating cartridge 28 by means of which the female die may be heated to a temperature of from 150° to 500° F, depending upon the fusion temperature of the material being treated. Optionally, a hole 26b may be transversely of the groove. The supplemental heating of the female die is not always required.

The male die component 14 comprises a block 30 which has a tapering horn 32, at the lower extremity of which there is a blade 34, the length of which corresponds to the length of the groove 24 and the thickness of which corresponds to the width of the groove 24 so as to be telescopically interengageable within the groove 24. The terminal end of the blade contains a concave groove 35 corresponding in curvature to the bottom of the groove 24. The end of the blade may optionally be knurled or serrated or both, depending upon the material and the shape to be imparted thereto. The upper end of the block 30 contains a threaded opening by means of which it is attached to a sonic vibrator 38, preferably an ultrasonic vibrator, which, in turn, is mounted to a part 40 by means of which it may be raised and lowered with respect to the female mold component in order to enter the blade into the groove 24 and remove it therefrom. An ultrasonic vibrator, if employed, should have a capacity for producing ultrasonic vibrations of 20,000 to 100,000 cycles per second or more. During application of the ultrasonic vibrations, the blade 34 is pressed down into the groove 24 to apply a pressure to the material being treated of approximately 15 pounds per square inch.

Figure 6A:
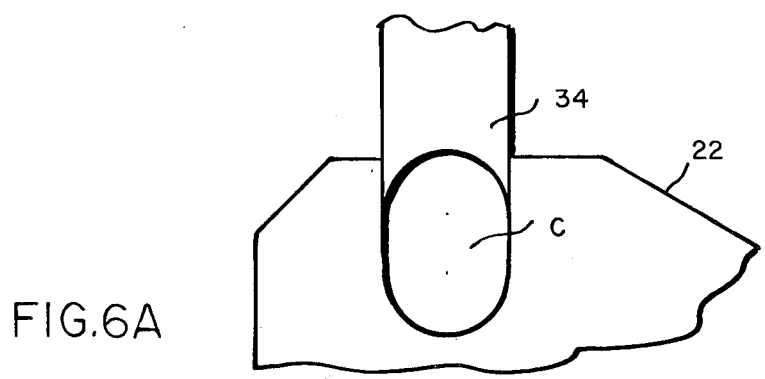
FIG. 6A shows the mold cavity defined by the grooves in the male and female dies.

The grooves 24 and 35 are designed to collectively define a substantially parabolic recess or mold cavity C, FIG. 6A, within which the part to be treated is received, condensed and subjected to ultrasonic vibrations, the latter being focused on the geometrical center of the cross section imparted to the part by the mold parts as shown in FIG. 6A.

In order to obtain a rigid structure, it is necessary to control the temperature closely so as to cause the resinous fibers and/or the resin of the treated fibers to melt and adhere or coalesce to form a substantially homogeneous or heterogeneous structure without substantial flow or fusion since in this latter state, because of the memory characteristics of synthetic resin, the resin tends to globular separation. Ultrasonic heating is especially appropriate for maintaining a close enough control of the heating to raise the temperature to the point of melting without passing into the state of flow or fusion and because it is possible to optically focus the sound at the geometric center of the cross section of the part so that heating can take place from the center outwardly, thus avoiding scorching of the exposed surface of the part or overheating at the center as is characteristic when effecting heating from externally with the use of electrically heated dies.

Adjacent the die assembly, there is mounted a reel 42 diagrammatically illustrated in FIG. 4 which rotates in the direction of the arrows shown to move successful lengths of the material to be treated into the groove 24 at a time when the male die component is elevated therefrom. The reel 42 as used herein is of conventional design and is currently used in lace tipping machines such as the machine made by Artos Engineering, Milwaukee.

In addition to subjecting the material to ultrasonic resonance and pressure of the male die and the heat supplied by the female die, the latter is vibrated in oscillation in a plane at right angle to the direction of the ultrasonic resonation and this is obtained by means of a vibrator 44 to which the block 18 is fastened by bolt 46 extending through the bolt holes 20.

Figure 8:
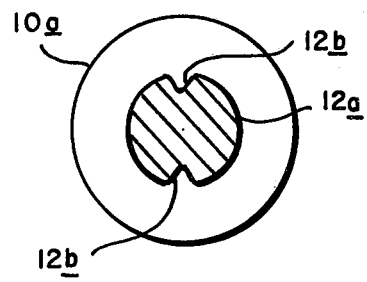
FIG. 8 is a transverse section of a rigidified portion of lace made with the dies shown in FIG. 7.

As illustrated in FIGS. 4, 5, 6 and 6A, the grooves 24 and 35 collectively define an opening which is of parabolic section. It may be desirable to further stiffen the section by modifying its compacted cross section to provide longitudinally extending grooves therein. This may be achieved by modifying the shape of the grooves 24 and 26 by providing at the bottom of these grooves ribs 48 and 50 which, in the interengaged position of the dies, do not touch each other. The ribs will form in the condensed portion of the lace longitudinal grooves 12b, 12b as shown in the enlarged section FIG. 8, the effect of which is to further stiffen the section. The grooves may have other cross-sectional shapes. However, the focusing effect provided by the parabolic groove is preferred.

Figure 9:
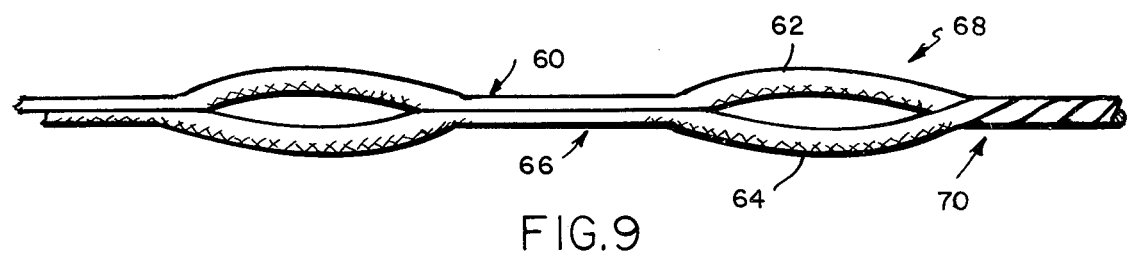
FIG. 9 is a plan view of a multistrand structure made according to this invention.

In the process of rigidifying the ends of shoelaces to make tips as described above, the fibers of the constituent yarns of the lacing are welded to each other. Consequently, the method is useful for the purpose of welding the yarns of multiyarn structures to each other to provide dimensionally stable structures as shown in FIGS. 9 to 14. In FIG. 9, there is shown a multistrand structure 60 comprising a strand 62 and a strand 64, each of which may be comprised of a single yarn or a plurality of yarns joined to each other according to this method to form substantially longitudinally spaced rigid portions 66 between which there are unjoined portions 68. The strands 62 and 64 of the rigid portions may be parallel as in the portion 66 or twisted as in the portion 70.

Figure 10:
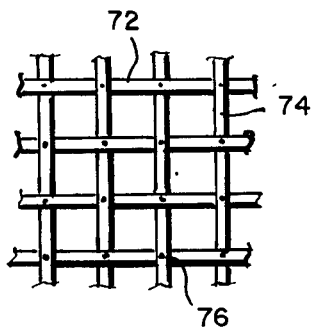
FIG. 10 is a plan view of a portion of an open basket weave fabric made according to this invention.

FIG. 10 illustrates a portion of an open weave fabric, for example, a basket weave, comprising crossing yarns 72 and 74 which has been made dimensionally stable by bonding the crossing yarns at their places of crossing indicated at 76 according to the method related above.

Figure 11:
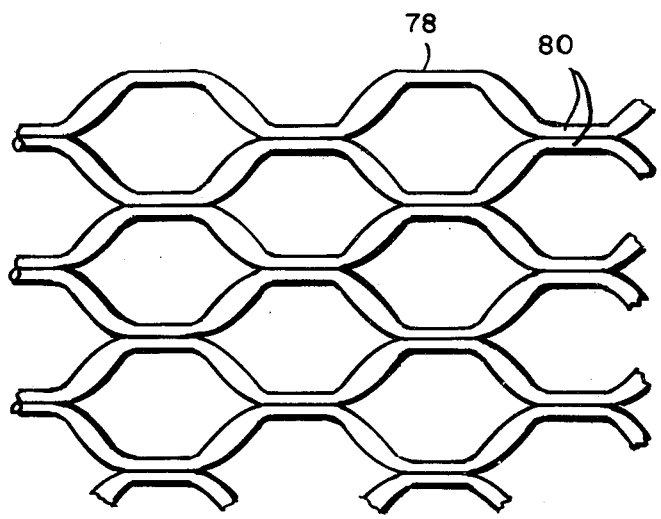
FIG. 11 is a plan view of a portion of an open unwoven association of yarns.

A structure may be made according to this method as shown in FIG. 11 wherein the yarns 78 are disposed in unattached predetermined relation to each other with substantially parallel portions 80 closely adjacent, the latter being welded to each other to form a dimensionally stable structure by the aforesaid method.

Figure 13:
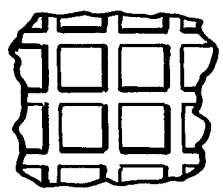
FIGS. 12, 13 and 14 diagrammatically show portions of the female dies which would be used in making structures according to FIGS. 9, 10 and 11, the male dies for which would be appropriately shaped for interengagement therewith.
Figure 12:
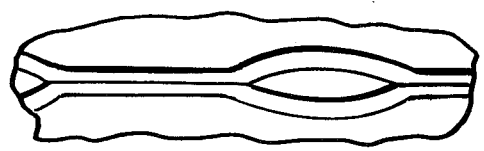
Figure 14:
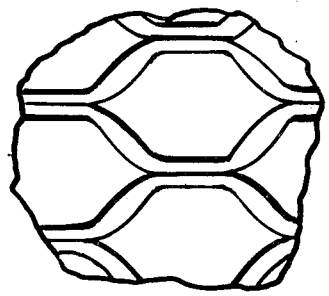

Dies of appropriate shape for welding the structure described are shown in FIGS. 11, 12 and 13 diagrammatically, it being understood, of course, that the male dies would be appropriately shaped to be interengaged with the female dies.

The yarn of which the lacing or other structure is made must, of necessity, be comprised of a substance which can be condensed and made rigid by an application of pressure and heat, followed by cooling. Manmade materials such as nylon are extensively used for making shoelaces and are amenable to the treatment described above to provide shoelaces with rigid or semirigid tips at their opposite ends. Rigid tips may also be attained by combining with natural fibers such as cotton and wool, nylon fibers in the proportion of about 35 percent natural fibers to 65 percent man-made fibers. The man-made fibers may be incorporated as a core within a covering of natural fibers and/or as a covering and when treated according to the method, the man-made fibers tend to bloom and expand into the covering or core to thus thoroughly impregnate the covering or core.

The method can also be used to treat materials other than textile, for example, paper fibers, leather fibers and the like mixed with synthetic resin fibers such as nylon, polypropylene, polyesters and the like.

It should be understood that the present disclosure is for the purpose of illustration only and includes all modifications or improvements which fall within the scope of the appended claims.

I claim:

1. A method of rigidifying a portion of a flexible length of fibrous material embodying a material which may be made rigid and hard by pressure and heating comprising subjecting the portion to be made rigid while confined within a die of predetermined cross section desirably to be imparted to the portion to be rigidified to sonic vibrations in a plane diametral to the axis of the portion and simultaneously to reciprocation in a plane at right angles to said diametral plane to cause the constituent fibers to soften and become bonded to each other.

2. A method according to claim 1 comprising focusing the ultrasonic vibrations at the longitudinal axis of the portion to be rigidified.

3. A method according to claim 1 comprising heating the die to a temperature in the order of 150°–850° F.

4. A method according to claim 1 comprising applying pressure to the end portion during vibration of about 15 pounds per square inch.

5. A method according to claim 1 comprising forming longitudinal grooves in the treated portion.

6. A method of rigidifying predetermined portions of a structure comprised of man-made fiber to render the structure dimensionally stable comprising subjecting said portions to pressure to compact and condense the constituent fibers in said portions, subjecting the condensed portions to ultrasonic vibrations in a predetermined direction for a sufficient length of time to effect coalescence of the fibers at said portions at a temperature below fusion, simultaneously oscillating the condensed portions at right angles to the direction of the ultrasonic vibrations, removing the structure from the application of said ultrasonic vibrations and oscillations and allowing the structure to cool.

* * * * *